March 10, 1942.  A. SCHOLIN  2,276,100
FLUID FLOW INDICATOR
Filed April 24, 1939  4 Sheets-Sheet 1
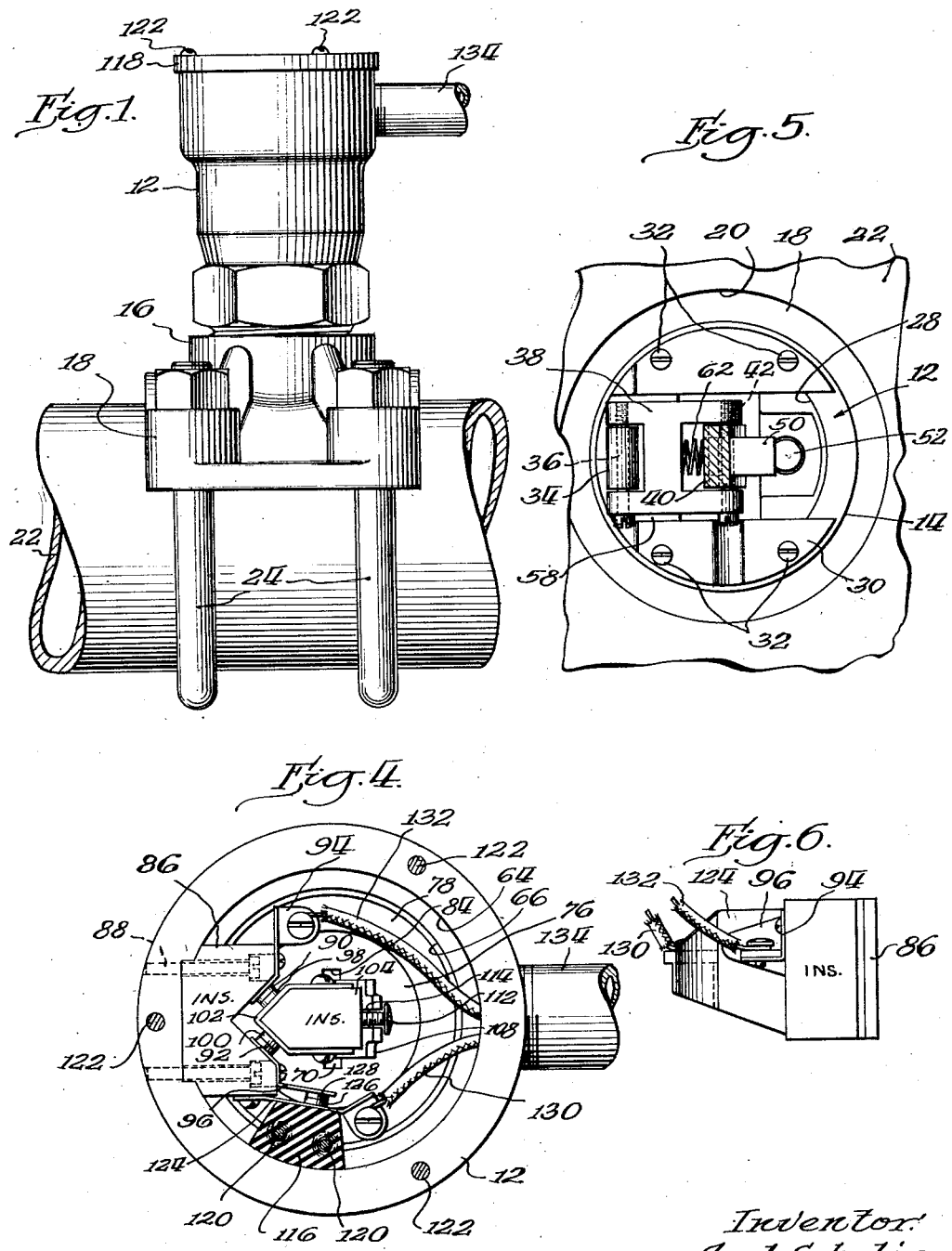
Inventor:
Axel Scholin
By Williams, Bradbury
McCaleb & Hinkle
Attys.

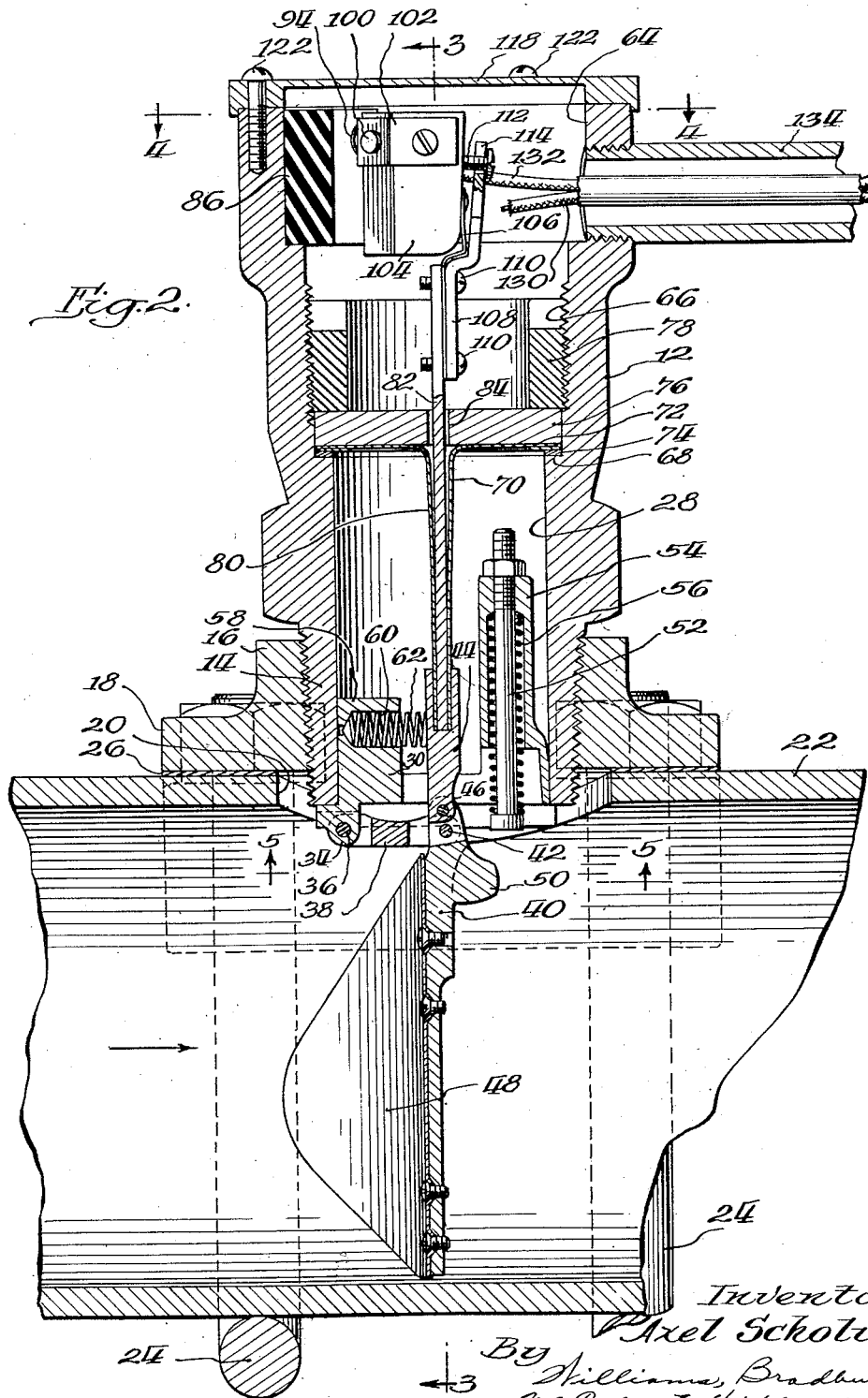

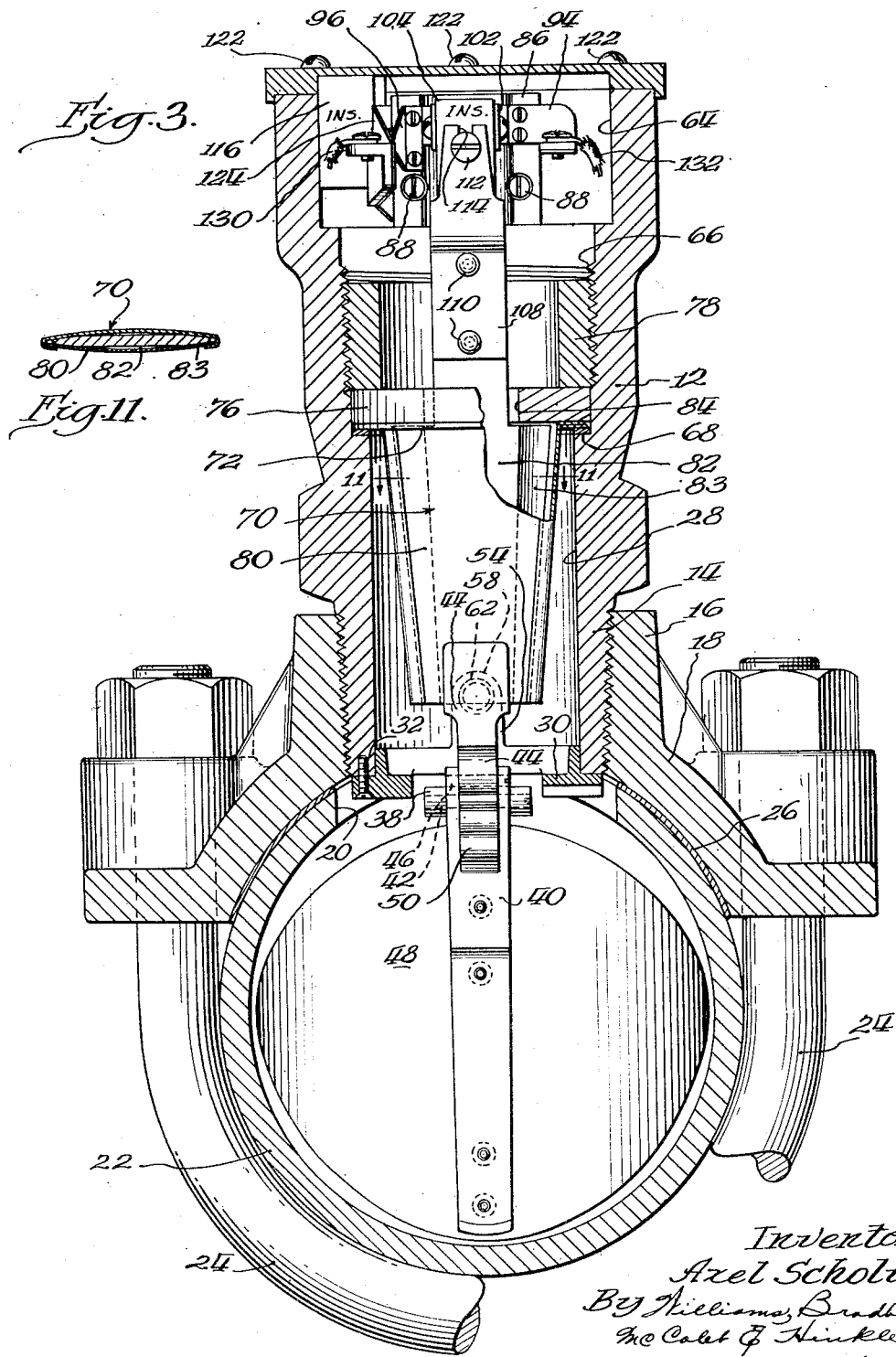

March 10, 1942.　　A. SCHOLIN　　2,276,100
FLUID FLOW INDICATOR
Filed April 24, 1939　　4 Sheets-Sheet 4
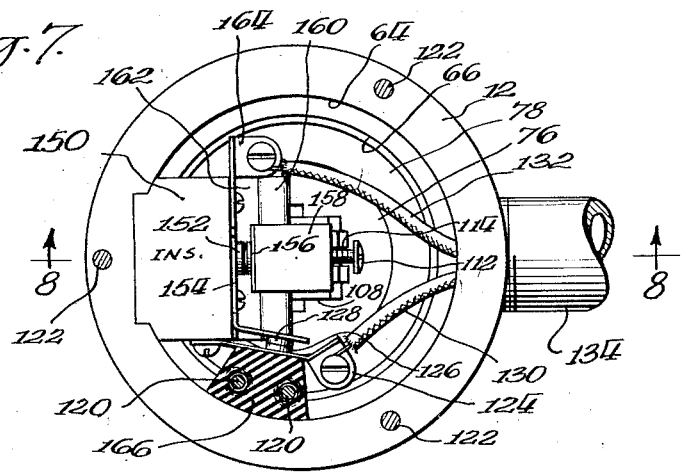
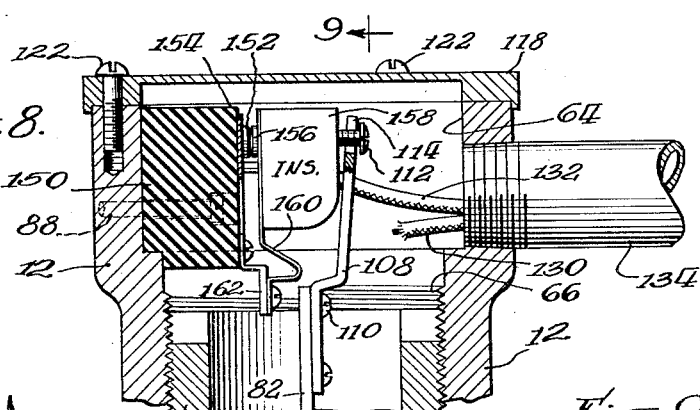
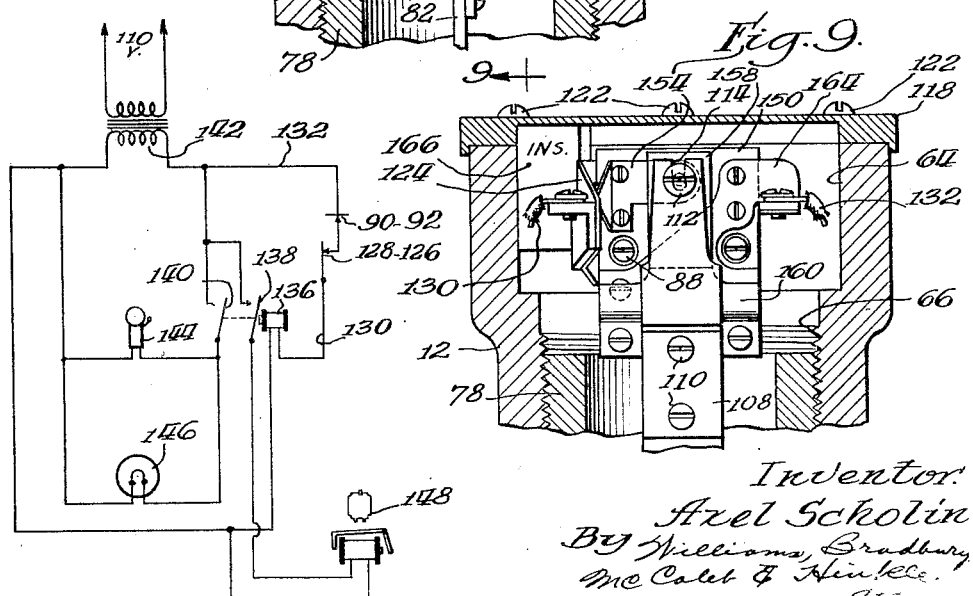
Inventor.
Axel Scholin
By Williams, Bradbury,
McColl & Hinkle
Attys.

Patented Mar. 10, 1942

2,276,100

UNITED STATES PATENT OFFICE 2,276,100

FLUID FLOW INDICATOR

Axel Scholin, Chicago, Ill., assignor of one-third to Wilbur M. Tiffany, and one-third to Carl W. Scholin, both of Chicago, Ill.

Application April 24, 1939, Serial No. 269,818

6 Claims. (Cl. 200—81)

My invention relates generally to fluid flow indicators, and more particularly to apparatus for indicating the flow of water in automatic sprinkler systems, and generally indicating the flow of liquids in pipes.

It is an object of my invention to provide an improved flow indicator having an improved means for sealing the mechanism from the fluid, the flow of which is to be indicated.

A further object is to provide an improved liquid or gaseous fluid flow indicator which may readily be attached to a pipe through which a fluid may flow, and which will be sensitive to indicate appreciable flow of the liquid, but will not respond to minor fluctuations in pressure.

A further object is to provide an improved pressure-tight durable seal capable of transmitting motion from one side thereof subjected to pressure, to the other side thereof which may be at atmospheric pressure.

A further object is to provide an improved indicator for automatic sprinkler systems to indicate a flow of water in the system and thus apprise the attendant of the opening of one or more of the sprinkler heads.

A further object is to provide an improved flow indicator of simple and durable construction which may be economically manufactured, and which will be reliable in operation.

Other objects will appear from the following description, reference being had to the accompanying drawings, in which:

Figure 1 is a side elevational view of the flow meter showing it attached to a pipe;

Figure 2 is a central longitudinal sectional view of the indicator;

Figure 3 is a transverse vertical sectional view thereof taken on the line 3—3 of Figure 2;

Figure 4 is a sectional view taken on the line 4—4 of Figure 2;

Figure 5 is a horizontal sectional view looking upwardly and taken on the line 5—5 of Figure 2;

Figure 6 is a detailed view of the switch mechanism;

Figure 7 is a plan view of a modified form of switch;

Figure 8 is a fragmentary sectional view of the modified form of switch mechanism taken on the line 8—8 of Figure 7;

Figure 9 is a sectional view taken on the line 9—9 of Figure 8;

Figure 10 is a wiring diagram of the electrical indicating circuits; and

Figure 11 is a sectional view of the sealing sleeve taken on the line 11—11 of Figure 3.

Referring particularly to Figs. 1, 2 and 3, the flow indicator comprises a main body casting 12, which has a shank 14 threaded in a boss 16 forming part of a saddle 18. The saddle 18 is clamped over an opening 20 formed in a pipe 22 by means of U-bolts 24, a gasket 26 being interposed between the saddle 18 and the pipe 22 to form a fluid-tight seal. The lower portion of the body 12 and its shank 14 are provided with an axial bore 28, the lower end of which is partially closed by a flanged casting 30, which is secured to the lower end of the shank 14 by cap screws 32. The casting 30 has a boss 34 providing a support for a pivot pin 36 which forms a pintle for one end of a link 38. The other end of the link 38 is pivoted to a vane arm 40 by a pin 42. The upper end of the arm 40 is also pivoted to a socket 44 by a pin 46.

The arm 40 carries a vane 48 which, as best shown in Fig. 3, has a projection on a plane perpendicular to the pipe 22, which is substantially the shape of the bore of the pipe. The vane is, however, warped to a substantially cylindrical shape, so that it may swing in a counter-clockwise direction (Fig. 2) to a position such that the arm 40 lies closely adjacent the top of the pipe 22. The arm 40 is provided with a lug 50 which, when the vane swings counter-clockwise from the position in which it is shown in Fig. 2, is adapted to abut against the head of a resilient stop bolt 52 which is guided for vertical sliding movement in an upwardly extending cylindrical boss 54 forming part of the casting 30. A spring 56 normally presses the bolt 52 downwardly, and resists with an appreciable force, movement of the vane 48 as it approaches a position closely adjacent the upper inner surface of the pipe 22.

The casting 30 is provided with a lug 58 which projects within the bore 28, and this lug has a transverse socket 60 formed therein to receive a compression coil spring 62, the latter being under initial compression and engaging the socket part 44 so as to move the latter to the right (Fig. 2) and, through the lever action of the double pivotal connection of the arm 40, to force the vane 48 to its normal position in which it is shown in Fig. 2.

The upper end of the body 12 is provided with an enlarged counter-bore 64 and has a portion 66 of reduced diameter which is internally threaded. A shoulder 68 is formed between the threaded portion 66 and the bore 28, and forms a seat for a sealing sleeve 70. The latter, as best shown in Figs. 2 and 3, has an upper generally circular portion 72 which is bent back upon itself around its peripheral edge, and is clamped between a suitable gasket 74 which rests upon the shoulder 68, and a clamping plate 76 which is securely clamped in position by an externally threaded hollow sleeve 78. The sleeve 70 has a depending generally tubular portion 80 which is generally elliptical in transverse section, and tapers from a width approaching that of the diameter of the bore 28 at the top to a substantially lesser width at the lower end thereof, where it is received in the socket member 44. Within the sleeve 70 is an actuating arm 82 which projects through a suitable aperture 84 formed in the backing plate 76, and the lower end of which is soldered or welded to the lower extremity of the sleeve 70. The sleeve 70 and arm 82 are thus rigidly secured at their lower ends to the socket member 44, so that movement of the latter is transmitted to the arm 82, the sleeve 70 flexing sufficiently to permit such movement. The sleeve 70 is preferably made of a tough corrosion resisting metal, such as Monel metal, which is sufficiently strong to resist the differential pressure on the opposite sides thereof, and is as thin as is compatible with its performance of these functions. It will be noted that the movement of the vane is substantially reduced by the leverage ratio determined by the short distance between the pins 42 and 46, so that the socket part 44 will be moved but a short distance upon movement of the vane through an angle of approximately 90°. This movement will, however, be transmitted as swinging movement of the arm 82 about the effective point of flexure of the depending portion of the sleeve 70. It will be understood that due to the construction of the depending portion 80 of the sleeve 70, and the slight amount of clearance between it and the arm 82 and the upper end portion of the sleeve (slightly exaggerated in Figs. 2 and 11), the latter may readily bend at any point along a substantial distance of its upper portion. As a result, the actual flexure which takes place at any point along the length of the upper part depending portion 80 of the sleeve 70 will be very small, with consequent minimum stresses in the depending portion of the sleeve. The inner surfaces of the sleeve may slip slightly against the surfaces of the arm 82 as the latter moves, thereby facilitating such movement. As a result of this construction, the sealing sleeve will have an extremely long, useful life, and will not tend to crystallize and break due to fatigue, as might be the case if the flexure were confined to a limited portion of the length of the sleeve. Furthermore, the movement of the socket part 44 and arm 82 is small compared to the length of the depending portion 80 of the sleeve 70, so that only a slight flexure of the sleeve is necessary to accommodate maximum swinging movement of the vane 48, and hence of the arm 82.

Within the bore 64 at the upper end of the body, is located a switch which may be of any suitable construction, but is preferably of either the form shown particularly in Figs. 4, 5 and 6, or the modified form shown in Figs. 7, 8 and 9. This switch comprises a block 86 of insulating material which may be secured to the body by cap screws 88, the heads of which are recessed in the block. Stationary switch contacts 90 and 92 are secured to connection lugs 94 and 96, respectively, the lugs being secured to the block 86. The faces of the contacts 90 and 92 are preferably at an angle to one another, so as to be capable of assuring a good electrical contact with cooperating contact elements 98 and 100, which are secured to a conducting clip 102, the latter being secured to an insulating member 104. The member 104, as shown in Fig. 2, is secured to the upper end of the arm 82 by a leaf spring 106, the lower end of which is clamped between the upper end of arm 82 and an extension bracket 108, which is secured to the arm 82 by screws 110. The spring 106 thus normally holds the block 104 in position, such that the contacts 90, 92, are bridged by the contacts 98, 100 and the conducting clip 102, thus maintaining a completed circuit through the switch. The arm 82 is, however, adapted to swing clockwise (Fig. 2) when the vane 48 is swung counter-clockwise upon the flow of the fluid through the pipe 22 from left to right, as indicated by the arrow in Fig. 2. To permit slight clockwise swinging movement of the arm 82 without opening the switch contacts, the extension bracket 108 of the arm 82 is provided with a lost motion connection with the block 104, consisting of an adjustable screw 112 which is threaded in the block 104 and projects through a slot 114 formed in the upper end of the extension bracket 108. Slight movements of the vane 48, such as might result from pressure waves in the pipe, do not therefore open the switch.

Means are provided to break the circuit which is closed by the switch contacts 98 and 100, whenever the mechanism is tampered with or uncovered for inspection. This means comprises a wedge 116 of insulating material which is secured to the cover 118 by cap screws 120 and which, when the cover is secured in normal position by screws 122, engages a resilient contact arm 124 (Fig. 4) and forces a contact point 126 carried thereby into engagement with a contact 128 carried by an extension of the lug 96. The resilient arm 124 has a lug portion for connection to a wire 130, while the other wire 132 to complete the circuit is connected to the lug 94, the wires extending from the body 12 through an electrical conduit 134 threaded into the upper end of the body.

As shown in Fig. 10, the switch which includes the contacts 90 and 92 is connected in series with the switch 126, 128, and the circuit through this series of switches is connected in series with the winding of a relay 136 which is adapted to actuate a pair of switches 138, 140, these switches being open when the relay 136 is energized. Current through this series circuit may be supplied from any suitable source indicated as the secondary 142 of a transformer connected to a suitable source of alternating current. When the relay 136 is de-energized upon the opening of either of the two switches within the body of the flow indicator, circuits likewise deriving power from the transformer secondary 142 and including an alarm bell 144 and a signal lamp 146 are closed by the switch 140. The switch 138 may be connected to any suitable annunciator device 148 so as to indicate the particular flow indicator in which the circuit has been broken, whenever a plurality of such flow indicators are used in a single system. From the foregoing description, it will appear that upon any appreciable flow of liquid through the pipe 22 in the direction indicated by the arrow in Fig. 2, the vane 48 will be swung in a counter-clockwise direction, thereby applying a greatly multiplied force to swing the arm 82 in a clockwise direction against the force of the compressed spring 62. Inasmuch as when the vane 48 swings to a position closely adjacent the top of the pipe 22, the spring 62 is relatively ineffective to initiate return movement of the vane, the spring pressed stop 52 is provided so as to initiate such return movement of the vane. As the arm 82 is moved in conformity with the swinging movement of the vane 48, the long depending portion 80 of the sleeve 70 is free to flex substantially throughout its length, and as a result, the strains due to such flexure are distributed throughout its length. The unit stresses due to such flexure are therefore relatively small, and the sleeve may therefore be flexed back and forth a large number of times comparable to decades of actual service, without danger of failure due to fatigue of the metal. Since the peripheral edge of the sleeve 70 may be clamped by means of the threaded sleeve 78 with any desired degree of clamping pressure, a fluid-tight seal is assured. The major portion of the sleeve 80 is backed by the rigid backing plate 76, so that the thin sheet metal of the sleeve is adequately supported to resist the fluid pressure. Even the depending portion of the sleeve is in part backed and reinforced to resist the fluid pressure by the arm 82. The lost motion connection between the extension bracket 108 and the movable switch member 104 permits the vane 48 to move slightly resultant from pressure impulses rather than from actual flow conditions in the pipe 22 to take place without opening the switch. This is of advantage in many installations where the pipe 22 is connected to a water supply system in which the pressure may be subject to sudden variations which, were this lost motion connection not provided, would result in frequent false indications of flow. It will be understood that the indicator is designed to provide an indication only when substituted flow through the pipe 22 takes place.

In Figs. 7, 8 and 9, I have illustrated a simplified form of switch mechanism in which a block 150 of insulating material is secured in the bore 64 in the upper end of the body of the indicator, and has a single contact 152 secured to a lug 154 attached to the block 150. The movable contact 156 of the switch is carried by a block 158 of insulating material, the latter being supported by a leaf spring 160 which is attached to a bracket 162. The bracket 162 may be electrically connected to or formed integrally with a terminal lug 164 to which one of the circuit wires is connected. The leaf spring 156 may be made of phosphor-bronze, or the like, and be rigidly secured to the insulating member 148, and may have the movable contact 146 soldered or otherwise secured thereto.

The lug 154 may be provided with contacts 126, 128 similar to those of the previously described embodiment, these contacts being adapted to be held in engagement with one another by an insulating block 166 secured to the cover 118 by screws 120, it being understood that the contact 126 is adapted to be moved from engagement with the contact 128 when the cover and the insulating block 166 are removed. The remaining parts of the switch mechanism shown in Figs. 7, 8 and 9 are similar to corresponding parts of the previously described switch mechanism shown in Figs. 1 to 6, inclusive, and operate in a similar manner.

The switch mechanism of Figs. 7, 8 and 9 is slightly simpler than that previously described, and is less apt to get out of order, due to the fact that one set of contacts has been eliminated.

While I have shown and described particular embodiments of my invention, it will be apparent to those skilled in the art that numerous further modifications and variations may be made without parting from the more basic principles of my invention. I therefore desire, by the following claims, to include within the scope of my invention, all such similar and modified constructions whereby substantially the results of my invention may be obtained by substantially the same or equivalent means.

I claim:

1. In a fluid flow indicator of the type having a body arranged to be attached to a pipe, having a movable vane extending across the path of flow of the fluid in the pipe, and in which an electric switch controlled signal circuit is employed to provide an indication of movement of the vane, the combination of an elongated flexible metallic sleeve of generally elliptical transverse cross-section and tapering from one end to the other, an actuating arm extending through said sleeve and having one end thereof secured to the smaller end of said sleeve, said arm being adapted to actuate said switch, and clamping means for securing the larger end of said sleeve in fluid-tight relationship to the body of the indicator, thereby to provide a sealed means for the actuation of said switch.

2. In a liquid flow indicator, the combination of a vane arranged to be pivotally moved by fluid flow through a pipe, an actuating arm, a force multiplying connection between said vane and said arm, and means to seal said arm against flow of liquid under pressure comprising an elongated sleeve of generally elliptical cross section surrounding a portion of said arm and having one end rigidly secured thereto in fluid-tight relationship, said sleeve being longitudinally tapered and made of thin elastic sheet metal, whereby swinging movement of said arm will be permitted due to flexure of said sleeve.

3. In a fluid flow indicator of the type having a movable vane extending across the path of flow of the fluid, and in which an electric switch controlled signal circuit is employed to provide an indication of movement of the vane, the combination of a body, an elongated flexible metallic sealing sleeve of generally elliptical transverse cross section and tapering from one end to the other, said sleeve having a flange at its larger end, means to clamp said flange to said body, and an actuating arm extending through said sleeve and having one end thereof secured to the smaller end of said sleeve, said arm being adapted to actuate said switch.

4. In an apparatus having a portion thereof subjected to fluid pressure and another portion thereof subjected to atmospheric pressure, and in which mechanical motion is to be transmitted from one portion to the other, the combination of an arm extending from one portion to the other, and a longitudinally tapered sleeve of thin sheet metal of generally elliptical cross section having its larger end fixed to provide a separating wall between said portions of the apparatus, said actuating arm extending through said sleeve and rigidly secured to the smaller end of said sleeve to close the latter against the passage of fluid from one portion to the other of said apparatus.

5. In an apparatus having two portions thereof subjected to different fluid pressures, in which mechanical motion is to be transmitted from one portion to the other, the combination of an arm extending from one portion to the other, and a longitudinally tapered sleeve of thin sheet metal having a flange at its larger end to provide a separating wall between said portions of the apparatus, said actuating arm extending through said sleeve and rigidly secured to the smaller end of said sleeve to close the latter against the passage of fluid from one portion to the other of said apparatus.

6. In a flow indicator for providing an indication of appreciable flow of fluid through a conduit, the combination of a body secured to the conduit, a pivotally mounted vane carried by said body and projecting into said conduit, an actuating arm, a force multiplying connection between said vane and said arm, means providing a flexible seal around said arm to prevent flow of fluid from said conduit, a signal controlling switch having a movable member, and a lost motion connection between said arm and said member whereby slight movement of said vane may take place without moving said member.

AXEL SCHOLIN.